United States Patent [19]

Minamizono

[11] 4,123,067
[45] Oct. 31, 1978

[54] STYLUS VIBRATING MECHANISM IN PICKUP CARTRIDGE

[75] Inventor: Tsugikuma Minamizono, Numazu, Japan

[73] Assignee: Kabushiki Kaisha Mitachi Onkyo Seisakusho, Numazu, Japan

[21] Appl. No.: 813,401

[22] Filed: Jul. 6, 1977

[30] Foreign Application Priority Data

Jul. 7, 1976 [JP] Japan .............................. 51-90092[U]
Sep. 16, 1976 [JP] Japan .......................... 51-124744[U]
Dec. 8, 1976 [JP] Japan .......................... 51-164565[U]
May 13, 1977 [JP] Japan ............................ 52-61271[U]
May 13, 1977 [JP] Japan ............................ 52-61272[U]

[51] Int. Cl.² ............................................. G11B 3/02
[52] U.S. Cl. ..................................................... 274/37
[58] Field of Search ................................... 274/37, 38

[56] References Cited

U.S. PATENT DOCUMENTS 3,926,441 12/1975 Hibi et al. ............................... 274/37
4,009,885 3/1977 Pritchard ................................. 274/37

Primary Examiner—Harry N. Haroian

[57] ABSTRACT

Stylus vibrating mechanism having a vibration transmission part composed of a magnet, a pivot suspension formed integrally with the magnet and a rubber damper, the pivot suspension of which has a hole formed on the surface thereof opposed to a stylus tip in such a manner that a pivot is inserted into the hole to apply pressure to the rubber damper in the direction from the stylus tip and in parallel with the longitudinal center axis of a cantilever, and further having an adjusting means for adjusting the pressure applied to the rubber damper by adjusting a screw provided behind the rubber damper to apply pressure to the back side of the rubber damper.

11 Claims, 22 Drawing Figures

STYLUS VIBRATING MECHANISM IN PICKUP CARTRIDGE

BACKGROUND OF THE INVENTION

1. Field of the Invention

The present invention relates to a pickup cartridge, more particularly to a stylus vibrating mechanism in a pickup cartridge.

2. Description of the Prior Art

The stylus vibrating systems known heretofore include, as shown in FIGS. 1 through 3, the type where a thin wire extends from the center of a magnet and a pressure is applied to a rubber damper to anchor the wire fixedly to a stylus case; the type where a rubber damper is located on the front surface of a magnet toward a stylus tip and is pressed by a pivot from the opposite side with respect to the stylus tip; and the most general type where a magnet is surrounded with a rubber damper in the manner to be enveloped therein. However, these types have some disadvantages in the following points. In the first type using a thin wire, the fulcrum of vibration fails to be concentrated on a single point within the wire. In the type with a pivot, the entire vibrating system is liable to be pulled in the direction of rotation of a phono record since the force exerted in that direction is received only by the rubber damper. And in the type where the rubber damper surrounds the magnet, the fulcrum of vibration is rendered indefinite due to the structure that the vibrating system is supported by the rubber damper alone, and the entire vibrating system is pulled in the direction of rotation of a phono record.

SUMMARY OF THE INVENTION

The present invention has been accomplished in an attempt to improve the function of a pickup cartridge by eliminating the aforementioned disadvantages.

The object of the invention resides, therefore, in achieving high-fidelity reproduction of sound through variation of compliance, adjustment of frequency response and prevention of intermodulation distortion.

Another object of the invention is to provide a stylus vibrating mechanism in a pickup cartridge, the stylus vibrating system of which is supported in a manner that a pivot is inserted in the direction from a stylus tip and in parallel with the longitudinal center axis of a cantilever into a hole formed in a pivot suspension united integrally with a magnet of the vibrating system substantially at the center on the surface of the magnet opposed to the stylus tip and substantially on the longitudinal center axis of the cantilever to apply pressure a rubber damper located behind the pivot suspension and the magnet.

Another object of the invention is to provide a stylus vibrating mechanism capable of adjusting the pressure to a rubber damper by adjusting pressure to the back side of the rubber damper.

Still another object of the invention is to provide a stylus vibrating mechanism in which a rubber damper has a protrusion positioned at the center of the magnet and on the longitudinal center axis of the cantilever to effectively apply pressure to the magnet to easily fix a fulcrum of vibration.

Other object of the invention is to provide a stylus vibrating mechanism capable of reducing a mechanical impedance of a stylus tip.

Another object of the invention it to provide a stylus vibration mechanism capable of preventing a torque exerted around the longitudinal center axis of a stylus vibrating system without decreasing the compliance.

The above and other objects, features and advantages of the invention will become apparent from the following description and the appended claims, taken in conjunction with the accompanying drawings which show, by way example, the preferred embodiments of the invention.

DETAILED DESCRIPTION OF THE PREFERRED EMBODIMENTS

Figure 1:
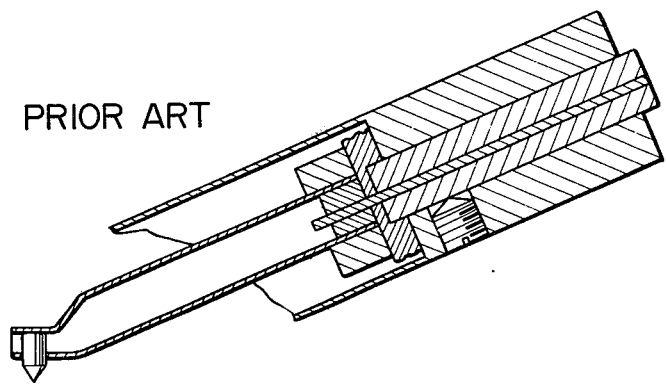
FIGS. 1 through 3 show the structures of conventional stylus vibrating systems.
Figure 2:
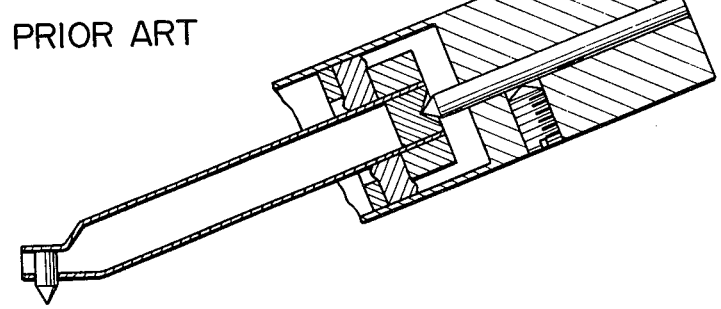
Figure 3:
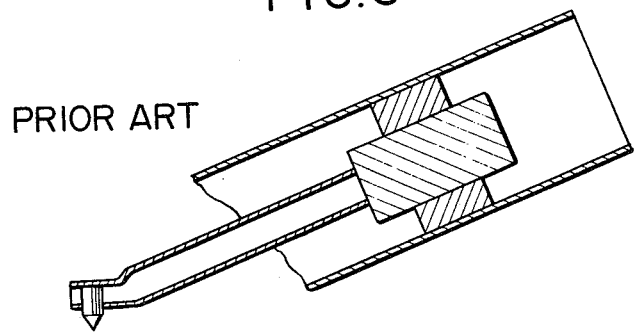
Figure 4:
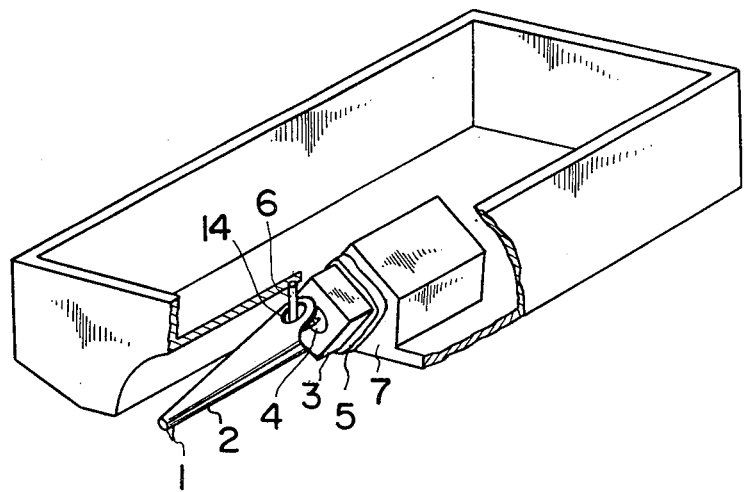
FIG. 4 is a perspective view illustrating the basic structure of a stylus vibrating mechanism of the present invention.
Figure 5:
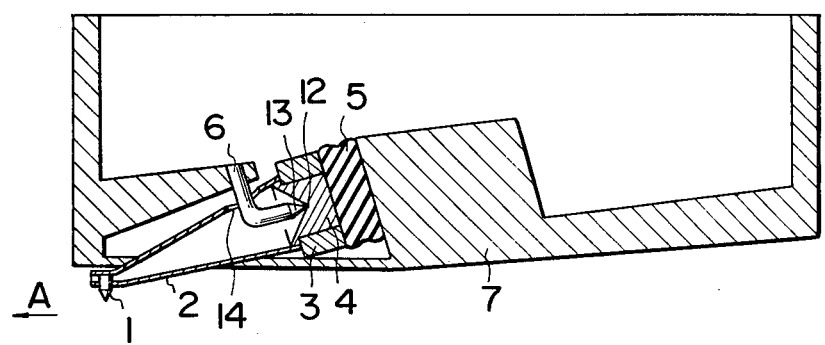
FIG. 5 is a vertical sectional view of the structure shown in FIG. 4.

Hereinafter the basic operating principle of the invention will be described in detail with reference to the accompanying drawings. In FIGS. 4 and 5 illustrating the typical principle of operation: a magnet 3, a pivot suspension 4, a rubber damper 5 and a stylus case 7 are disposed in sequence continuously to a cantilever 2 having a stylus tip 1 at its fore end, thereby constituting a vibrating system. An L-shaped or U-shaped pointed pivot 6 is inserted into the pivot suspension 4 where a tapered conical hole of a desired depth is formed substantially at the center of one surface of the magnet 3 opposed to the stylus tip and substantially on the longitudinal center axis of the centilever 2, in such a manner that the pivot end is in contact with the bottom of the conical hole on the pivot suspension 4 in the direction from the stylus tip of the cantilever 2 substantially in parallel with the longitudinal center axis so as to press the rubber damper 5 located behind the pivot suspension. Meanwhile, the other end of the pivot 6 extends outward from the cantilever 2 via a through hole 14 formed in the cantilever and is anchored to the stylus case 7 while being kept out of contact with the through hole 14. Due to the above-described structure, transmission of the vibration is performed in the following manner. When the stylus tip 1 is driven by a signal obtained from a record groove, the signal is transmitted from the stylus tip 1 through the cantilever 2 to the pivot suspension 4 united integrally with the magnet 3. Since the bottom 12 of the conical hole on the pivot suspension 4 is supported completely by the pivot end 13, single-point support is attained at that point which serves as a complete fulcrum of vibration, and the vibrating system is permitted to make complete rotation around this vibration fulcrum. Consequently, the vibration fulcrum is rendered definite to obtain high-fidelity reproduction of sound ranging from a bass region to a treble region. In playing a record, the entire stylus vibrating system is affected by the force exerted in the direction of rotation of the record, that is, in the direction of an arrow A in FIG. 5. Accordingly, the stylus vibrating system causes an increase of intermodulation distortion and also other various distortion to impede fidelity in sound reproduction. Regarding this point, remarkable effect of eliminating such demerits is produced in the present invention by the pivot 6 which is attached opposite to the pull exerted in the direction A. In this invention, since the pivot 6 is kept in contact with the pivot suspension 4 united integrally with the magnet 3 so as to press the rear rubber damper 5, there exists an advantage that the force applied to the rubber damper 5 can be varied in manufacture by adjusting the pressure, hence making it possible to attain a desired compliance with ease.

Figure 6:
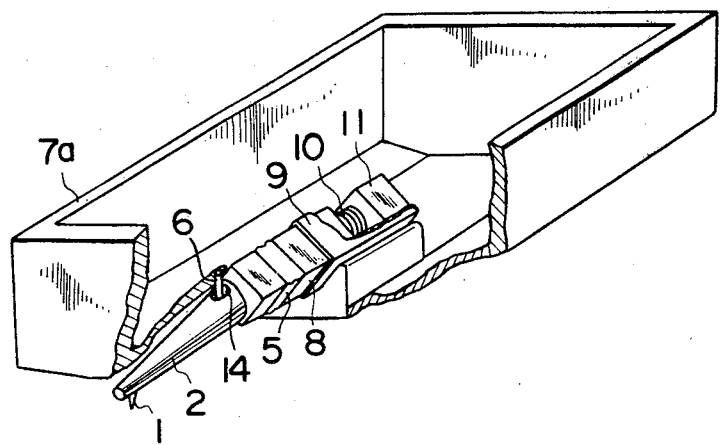
FIG. 6 is a perspective view of a first embodiment of the invention.
Figure 7:
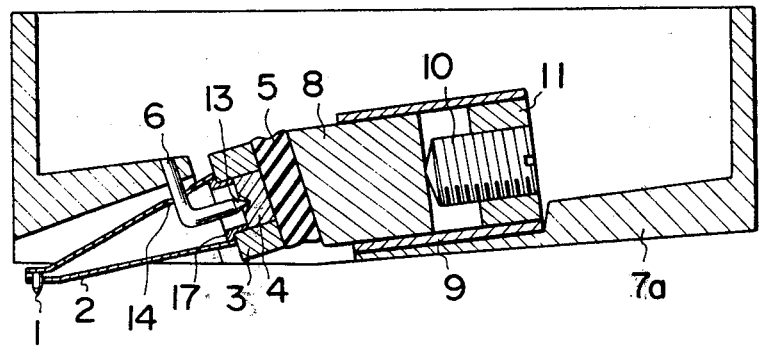
FIG. 7 is a vertical sectional view of the first embodiment.

Based on the operating principle of the invention described above, a variety of embodiments may be devised. In a first embodiment shown in FIGS. 6 and 7, an L-shaped pivot 6 is anchored to a stylus case 7a, and the pointed end 13 of pivot 6 is kept in intimate contact with the bottom 12 of a conical hole formed on a pivot suspension 4 united integrally with a magnet 3, a cantilever 2 and a stylus tip 1. A rubber damper 5 attached to one surface of a damper block 8 is pressed to the reverse side of the pivot suspension 4, and the other surface of the damper block 8 contained in a holder 9 is moved forward or backward by a pressure adjusting screw 10 supported by a screw support block 11, thereby applying a suitable damping force to the stylus vibrating system.

Although the basic operation of this embodiment is the same as the foregoing, it becomes possible to apply a minute damping force and also to achieve easy adjustment of the stylus tip compliance to a proper value.

Figure 9:
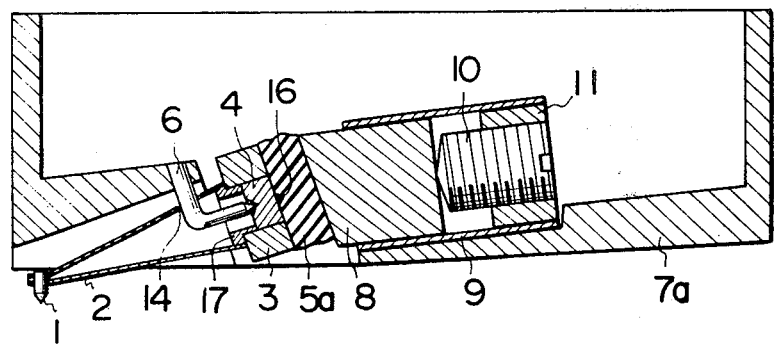
FIG. 9 is a side view of a rubber damper used in the second embodiment.
Figure 8:
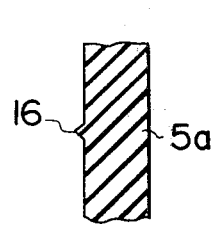
FIG. 8 is a vertical sectional view of a second embodiment of the invention.

In a second embodiment illustrated in FIG. 8, a protrusion 16 is formed integrally at the center of a rubber damper 5a opposed to a magnet 3 so that, when adjusting the stylus tip compliance and the frequency response in assembling a stylus vibrating mechanism as in FIG. 9, the pressure applied to the rubber damper 5a in contact with the magnet 3 can be controlled by moving a rubber-damper support block 8, thereby making it possible to obtain desired damping with ease for the stylus vibrating system and further to effect concentration of the force when the pressure applied to the rubber damper 5a acts as the said force. That is, the protrusion 16 formed at the center of rubber damper 5a opposed to the magnet 3 receives the pressure concentratively from behind and exerts this force on the magnet 3 concentratively. Then, since the protrusion 16 is composed of the same elastic material as that of the rubber damper 5a it is buried into the damper body as in FIG. 9 to render flat the surface in contact with the magnet for exertion of the force. Thus, efficient application of the pressure is implemented simultaneously with smooth action of the stylus vibrating system to increase the stylus tip compliance.

Figure 10:
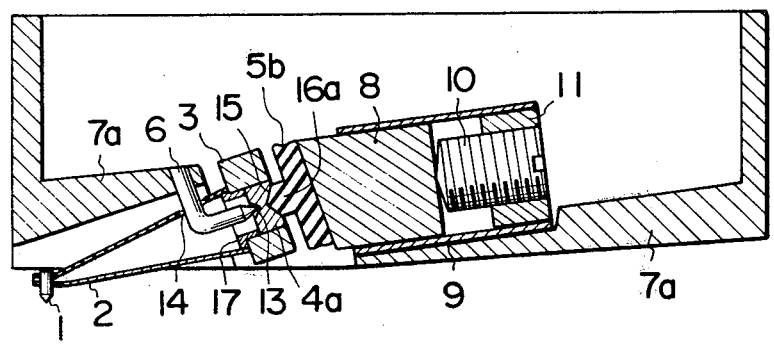
FIG. 10 is a vertical sectional view of a third embodiment of the invention.
Figure 11:
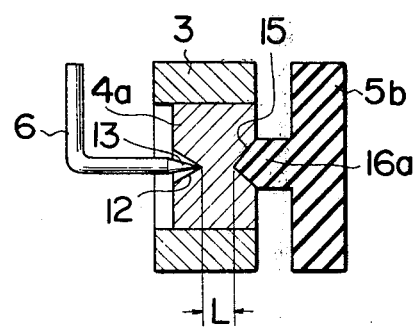
FIG. 11 is an enlarged vertical sectional view of a magnet and its periphery in the third embodiment.

In a third embodiment illustrated in FIGS. 10 and 11, a rubber damper 5b having a protruding end 16 is pressed into contact with the back of a pivot suspension 4a having a conical recess to support a pivot on the front thereof and located in the center of a magnet 3, and the back portion 15 of pivot suspension 4a for supporting the protruding end 16 of the rubber damper is recessed to narrow the center part of the pivot suspension which thereby shortens the distance L between the pivot end 13 and the protruding end 16 of rubber damper, hence decreasing the mechanical impedance of the stylus tip. Namely, the center part of the pivot suspension 4a is shaped into a narrow body to permit disposition of the pivot end and the rubber damper end in the proximity of each other, so that the forward and backward magnet displacement to transmit the stylus vibration is reduced to bring about the effect that decreases the mechanical impedance of the stylus tip. Meanwhile, since the damper support part 15 at the center of the pivot suspension 4a is shaped into a recess, a great pressure is applied from the rubber damper 5b, and the support point can be readily fixed and defined to produce remarkable effect in achieving high-fidelity reproduction as a result of reduction of harmonic distortion. In this case, a more effective result is obtainable by shaping the damper support part 15 into a conical recess where the protruding part of the rubber damper is fitted, as illustrated in FIG. 11.

Figure 12:
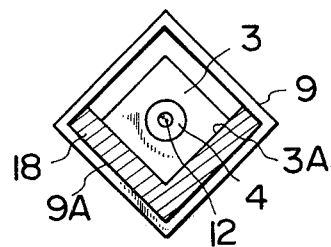
FIG. 12 is a front view of a support member incorporated in a holder used in a fourth embodiment.
Figure 13:
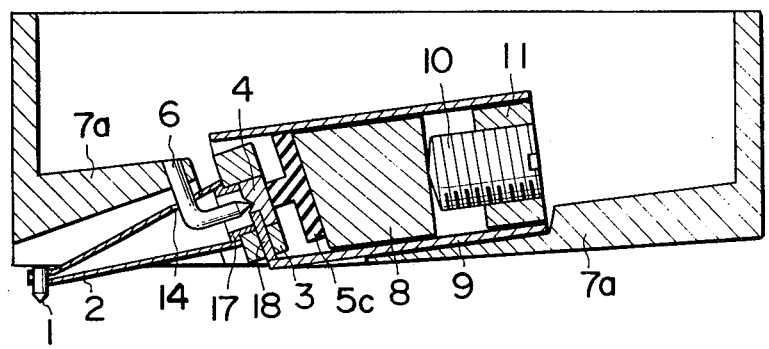
FIG. 13 is a vertical sectional view of the fourth embodiment.

In a fourth embodiment shown in FIGS. 12 and 13, lower sides 3A of a magnet 3 below its center are held fixedly by a support member 18 of the shape fittable to the sides 3A, and the support member 18 is anchored to an inner wall 9A of a holder, so that the torque exerted around the longitudinal center axis of the stylus vibrating system is preventable without decreasing the compliance. Thus, the rotation of the stylus vibrating system is effectively suppressed in the said direction to bring improvement of crosstalk, reduction of intermodulation distortion and so forth. Meanwhile, since the support member 18 holds only the lower sides of the magnet 3 below its center, the vertical motion of the stylus vibrating system is not affected at all, hence avoiding reduction of the stylus tip compliance and accomplishing perfect performance of effective record playing. By selecting an elastic lightweight material to compose the support member, it becomes possible to eliminate an unnecessary load for the stylus vibrating system with resultant merits of facilitating assembly of the stylus vibrating system and improving production efficiency.

Figure 14:
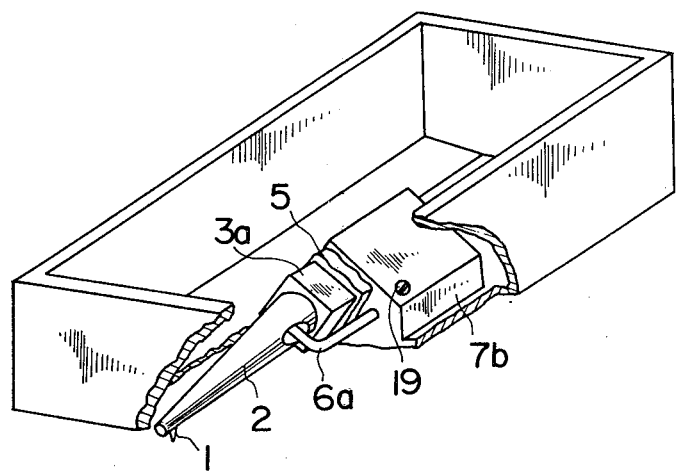
FIG. 14 is a perspective view of another embodiment.
Figure 15:
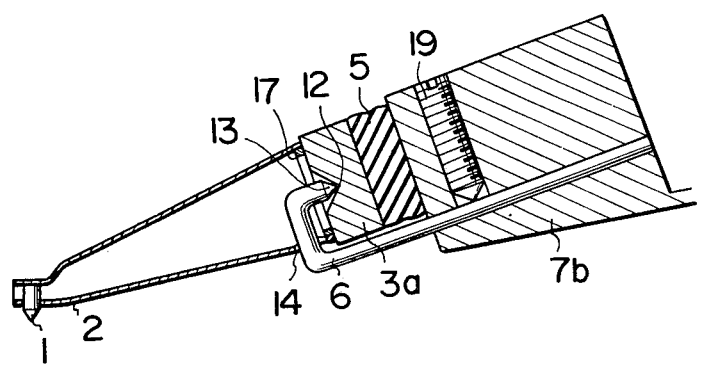
FIGS. 15 through 16 are vertical sectional views of the other embodiments.
Figure 16:
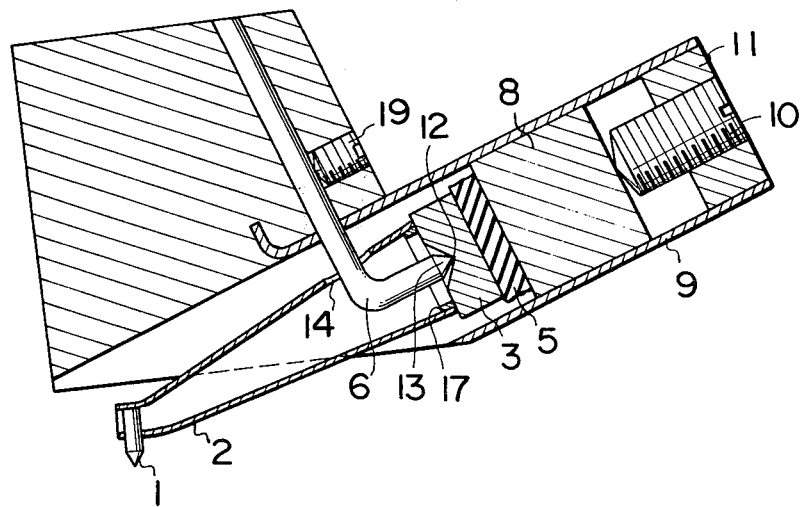

Further embodiments are shown in FIGS. 14 through 16. In the mechanisms of FIGS. 14 and 16, the non-pointed end of a U-shaped pivot 6a extends to be inserted into a hole formed on a stylus case 7a and is anchored thereto with a pivot set screw 19. FIG. 16 illustrates a system employed often in the general moving-magnet type or induced-magnet type cartridge. It is applicable to a mechanism in which a stylus holder 9 is inserted into a pole piece in the cartridge body and is fixed thereto. In this example, an L-shaped pivot 6a is anchored to a stylus case 7a by the use of a screw or a bonding agent, and a suitable pressure is applied to a rubber damper 5 by means of an adjusting screw 10 from the opposite side with respect to the pivot, thereby setting the mechanical impedance of the stylus tip to a proper value. In any of the above examples, the basic operating principle is the same as the aforementioned.

Figure 17A:
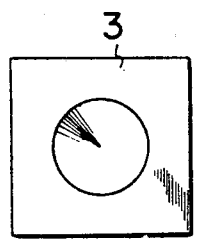
FIGS. 17b through 19b are vertical sectional views respectively of frontviews of FIGS. 17a to 19a each showing a pivot suspension.
Figure 17B:
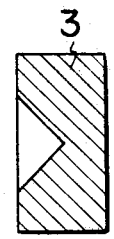
Figure 18A:
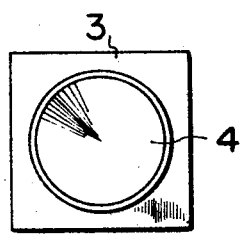
Figure 18B:
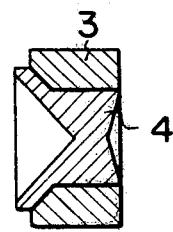
Figure 19A:
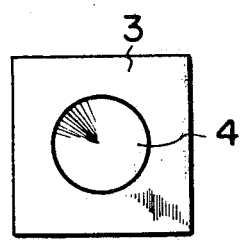
Figure 19B:
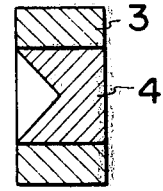

As for the shape of a pivot suspension, typical ones are illustrated in FIGS. 17 through 19. In the sample of FIG. 17, a conical recess is formed around the center axis of a magnet, and the magnet itself is used as a pivot suspension. In FIG. 18, a pivot suspension is composed of an easily processible material, and its one part protrudes from the surface of a magnet in the manner that a cantilever is attachable to the protrusion with ease. And in FIG. 19, a magnet and a pivot are composed of different materials individually, and the material of a pivot suspension is selected to be such that has excellent abrasion resisting property but is hardly processible.

According to the present invention, as described above, many problems that have been existing heretofore with regard to achieving a single fulcrum of vibration in a stylus vibrating system are solved by the technique of supporting a pivot in the direction from a stylus tip, so that complete unification of the vibration fulcrum is implemented to accomplish high-fidelity reproduction in the stylus vibrating system of a pickup cartridge.

What is claimed is:

1. A stylus vibrating mechanism in a pickup cartridge comprising;
    a cantilever having a stylus tip at the fore end and a through hole provided therethrough,
    a magnet disposed continuously to said cantilever,
    a pivot suspension, formed integrally with said magnet, having a tapered conical hole of a desired depth formed on said pivot suspension, the bottom of the hole being positioned substantially at the center of one surface of said magnet opposed to the stylus tip and substantially on the longitudinal center axis of said cantilever,
    a rubber damper located behind said pivot suspension and said magnet to form a vibration transmission part with the magnet and the pivot suspension,
    a stylus case anchored to a cartridge case supporting fixedly behind said rubber damper, and
    a pivot having a pointed fore end to be inserted into the conical hole of said pivot suspension in the direction from the stylus tip of the cantilever and in parallel with the longitudinal center axis in such a manner that the fore end of the pivot is in contact with the bottom of the conical hole of said pivot suspension and applies pressure to said rubber damper and that the other end of the pivot extends outward from the cantilever via the through hole and is anchored to the stylus case while being kept out of contact with the through hole.

2. The stylus vibrating mechanism in a pickup cartridge as claimed in claim 1, in which said pivot suspension is formed of the same material as the magnet.

3. The stylus vibrating mechanism in a pickup cartridge as claimed in claim 1, in which said pivot suspension is formed of a different material from the magnet.

4. The stylus vibrating mechanism in a pickup cartridge as claimed in claim 1, further comprising;
    a rubber damper support block being united integrally with said rubber damper and
    an adjusting means for adjusting the pressure applied to the rubber damper located in front, composed of an adjusting screw, a screw support block supporting said screw and of a holder, fixed to the stylus case
    in such a manner that said screw is provided in the holder adjacently to said damper support block which is movably contained in said holder so as to displace the damper support block forward or backward by adjusting said screw.

5. The stylus vibrating mechanism in a pickup cartridge as claimed in claim 4, in which said rubber damper has a protrusion formed integrally therewith substantially around the center of one surface thereof opposed to said magnet and substantially on the longitudinal center axis of the cantilever.

6. The stylus vibrating mechanism in a pickup cartridge as claimed in claim 5, in which said pivot suspension has a recess at the back portion thereof substantially around the center portion thereof and substantially on the longitudinal center axis of the cantilever in the manner that the protruding end of the protrusion of said rubber damper is pressed into contact with the recess formed at the back portion and that the center portion of the pivot suspension is so narrowed that the distance L between the pivot end and the protruding end of the rubber damper is shortened.

7. The stylus vibrating mechanism in a pickup cartridge as claimed in claim 6, in which said recess formed at the back portion is fitted in the shape of the protruding end of said rubber damper.

8. The stylus vibrating mechanism in a pickup cartridge as claimed in claim 4, further comprising
    a flexible supporting member of the shape fittable to the lower sides of the magnet below its center holding flexibly the lower sides and being anchored to the inner wall of the holder.

9. The stylus vibrating mechanism in a pickup cartridge in claim 8, in which said pivot suspension has a recess at the back portion thereof substantially around the center portion thereof and substantially on the longitudinal center axis of the cantilever, and said rubber damper has a protrusion formed integrally therewith substantially around the center portion of one surface opposed to the magnet and substantially on the longitudinal center axis of the cantilever, and the protruding end of said rubber damper being pressed into contact with said recess formed at the back portion so as to fit in with each other in shape.

10. The stylus vibrating mechanism in a pickup cartridge as claimed in claim 6, further comprising
    a flexible supporting member of the shape fittable to the lower sides of the magnet below its center holding flexibly the lower sides and being anchored to the inner wall of the holder.

11. The stylus vibrating mechanism in a pickup cartridge as claimed in claim 10, in which said pivot suspension has a recess at the back portion thereof substantially around the center portion thereof and substantially on the longitudinal center axis of the cantilever, and said rubber damper has a protrusion formed integrally therewith substantially around the center portion of one surface opposed to the magnet and substantially on the longitudinal center axis of the cantilever, and the protruding end of said rubber damper being pressed into contact with said recess formed at the back portion so as to fit in with each other in shape.

* * * * *